United States Patent [19]
Seifert

[11] 3,990,109
[45] Nov. 2, 1976

[54] MULTIPLE FLEXIBLE RECORD STORAGE DISK APPARATUS HAVING AN ACCESS ARM WITH ENHANCED DISK STABILIZING FEATURES

[75] Inventor: Hans-Gordon Seifert, Weil im Schoenbuch, Germany

[73] Assignee: International Business Machines Corporation, Armonk, N.Y.

[22] Filed: June 16, 1975

[21] Appl. No.: 587,462

[30] Foreign Application Priority Data
Dec. 21, 1974 Germany............................ 2460249

[52] U.S. Cl. .................................. 360/99; 360/86; 360/98; 360/105; 360/135
[51] Int. Cl.² ...................... G11B 5/82; G11B 25/04; G11B 5/54
[58] Field of Search ................. 360/99, 98, 86, 105, 360/122, 130, 133, 135; 74/445

[56] References Cited
UNITED STATES PATENTS
| | | | |
|---|---|---|---|
| 3,509,553 | 4/1970 | Krijnen | 360/98 |
| 3,703,713 | 11/1972 | Pohm et al. | 360/122 |
| 3,810,243 | 5/1974 | McGinnis et al. | 360/99 |
| 3,867,723 | 2/1975 | Penfold et al. | 360/98 |
| 3,931,645 | 1/1976 | Dodd et al. | 360/99 |

OTHER PUBLICATIONS
IBM Technical Disclosure Bulletin, F. K. King, Flutter Stabilizing Fins for a Flexible Disc Pack, vol. 17, No. 8, Jan. 1975, pp. 2400–2401.

*Primary Examiner*—Alfred H. Eddleman
*Attorney, Agent, or Firm*—H. F. Somermeyer

[57] ABSTRACT

An access arm for use in a flexible magnetic disk pack for a magnetic disk storage apparatus having a wedge-shaped hollow body with a lower horizontal confining surface supporting a magnetic head and an upper confining surface arranged at an angle thereto. When the access arm is inserted into the disk pack, the two confining surfaces form a flow channel for the air moved by the rotation of the disks. On the leading and on the trailing side of the access arm the upper confining surface has protruding parts, so that additional stabilizing air bearing forces are generated on the magnetic disk adjacent the lower confining surface.

9 Claims, 8 Drawing Figures

MULTIPLE FLEXIBLE RECORD STORAGE DISK APPARATUS HAVING AN ACCESS ARM WITH ENHANCED DISK STABILIZING FEATURES

RELATED APPLICATION

This application is an improvement over the apparatus and methods set forth in commonly assigned co-pending application for patent, Ser. No. 480,990, filed June 19, 1974 now U.S. Pat. No. 3,940,794.

BACKGROUND AND SUMMARY OF THE INVENTION

The invention relates to an access arm head carrier having a magnetic head for use in a magnetic disk storage consisting of a coaxial stack of flexible magnetic storage disks and in which the access arm can be selectively inserted between two magnetic disks during the rotation of the disks. One of the disks, by means of the access arm, is angularly bent in the form of a circle sector or an approximate circle sector in relation to the normal disk plane. The magnetic disks are guided in a spaced relationship from the surfaces of the magnetic head carrier by air bearings formed by air currents caused by the rotation of the magnetic disks.

It is known (IBM TECHNICAL DISCLOSURE BULLETIN, Volume 12, Number 1, June 1969, Page 81) to design an access mechanism for a magnetic disk storage consisting of a coaxial stack of co-rotating flexible magnetic storage disks in such a manner that two different parts of the access arm during the rotation of the disks can be successively inserted between two magnetic disks at a selected point of the disk pack. The part of the access mechanism which is inserted first causes the magnetic disks below (to a first side) the point of insertion to be angularly bent downwards in the form of a circle sector in relation to the disk plane. This action axially enlarges the space between disks at the point of insertion, so that a separate access arm to which the magnetic head is fixed and which is subsequently inserted can be applied to the bottom (recording) side of the magnetic disk above the point of insertion for recording/sensing data signals.

The known arrangement has the disadvantage that the access mechanism consists of two parts, whose access motions are performed successively. This arrangement leads to considerable delays in the access times, since each transducing access requires two successive mechanical operations.

It is also known (U.S. Pat. No. 3,703,713) to design an access mechanism with a magnetic head for a magnetic disk storage consisting of flexible magnetic disks in such a manner that it comprises a single access arm to which the magnetic head is fixed. The magnetic head carrier of the access arm which can be inserted between the magnetic disks at a selected point of the disk pack serves, on the one hand, to guide the disks at the point of insertion and, on the other, to support the magnetic head on the recording track. A magnetic disk is selected from the pack via a guide gap in the tip of the magnetic head carrier into which a magnetic disk for recording/sensing data is received by the access arm. As a result of the rotation of the magnetic disks, the confining surfaces of this guide gap lead to air bearings, by means of which the magnetic disk is guided at a short distance from the confining surfaces. The magnetic head for recording/sensing data is arranged flush with one of the confining surfaces of the guide gap on the surface plane.

The latter arrangement has the disadvantage that the access arm inserted into the disk pack operates with four surface planes of three magnetic disks. The guide gap of the access arm which, as a function of track addressing, is inserted onto a particular magnetic disk for recording/sensing data leads to substantial air resistances as a result of the radial depth of insertion, thus rendering the position of the access arm within the insertion space of the disk pack unstable.

It is the object of the present invention to design an access arm with a magnetic head for a magnetic disk storage consisting of a coaxial stack (disk pack) of flexible magnetic record disks in such a manner that the magnetic head, adjusted to a recording track on a magnetic disk is retained in a predetermined constant position in relation to the surface of the magnetic disk for recording/sensing data, irrespective of the radial depth of insertion.

This problem is solved in accordance with the present invention in that the surface shape of the magnetic head carrier insertable between two magnetic disks forms at least three areas of different distances between the surfaces of the magnetic head carrier and the magnetic disks defining the transducer access opening.

This arrangement has the advantage that in the transducer access opening of the disk pack, which is formed by only two magnetic disks, stabilizing bearing forces are generated for the magnetic disks passing along the magnetic head carrier of the access arm. These forces are produced by the air flows being subdivided into individual flows, whose magnitude can be chosen as a function of the dimensions of the different distances. The arrangement described has the further advantage that as a result of the irregular surface shape of the confining elements of the magnetic head carrier, air circulation channels are formed by means of which differences in pressure occurring on the leading or trailing edge of the access arm are compensated for.

The foregoing and other objects, features, and advantages of the invention will become apparent from the following more particular description of a preferred embodiment of the invention, as illustrated in the accompanying drawing.

THE DRAWING

FIG. 1 diagrammatically shows the complete arrangement of a magnetic disk storage incorporating an access arm with a magnetic head for recording/sensing data on flexible magnetic records arranged in the form of a disk pack.

DETAILED DESCRIPTION

Like numbers indicate like parts and structural features in the various views.

Figure 1:
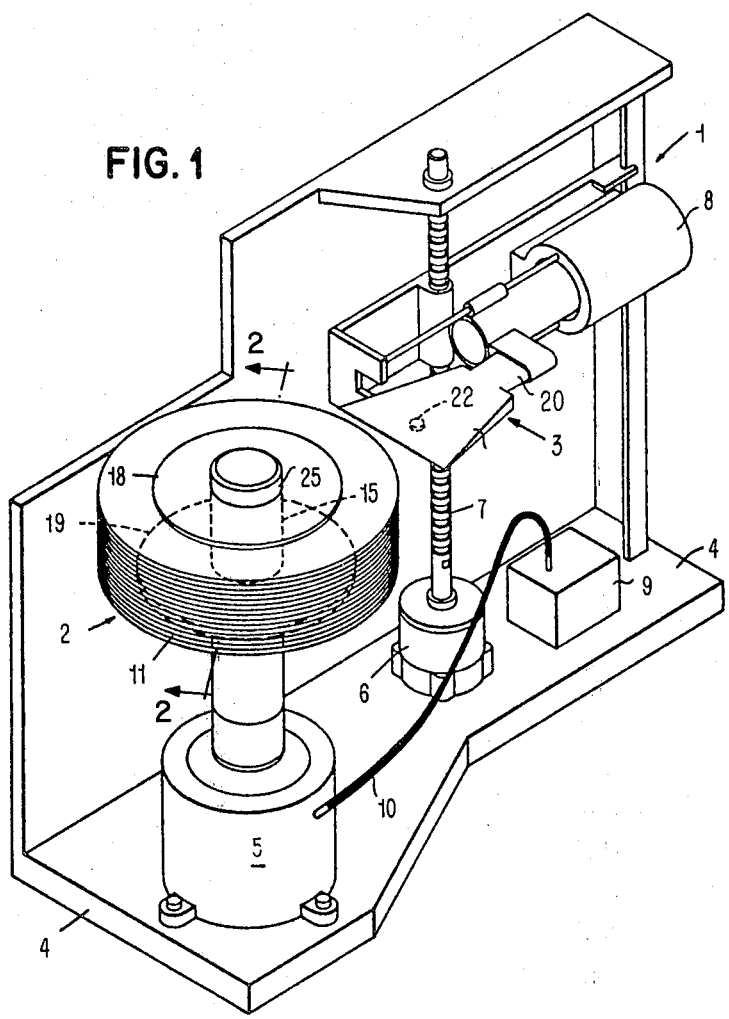

The magnetic disk storage unit 1 shown in FIG. 1 has disk pack 2 made up of flexible magnetic disks 11 rotationally mounted on base 5 firmly linked with frame 4. The disk pack 2 is rotated by a motor (not shown) to rotate the magnetic disks 11. The base 5 is connected to the pressurized air supply 10 connecting the pressurized air generator 9 to the interior of tubular drive shaft 15.

For recording/sensing data on the surfaces of any magnetic disk 11, the magnetic head 22 is mounted on magnetic head carrier 3. Using known techniques, carrier 3 can be selectively radially adjusted to particular circular tracks of selected magnetic disks. The adjustment is effected by the operational movements of the magnetic head carrier 3 which can be adjusted by spindle 7 in a vertical direction. The magnetic head 22 is shifted in a horizontal direction by means of the linear motor 8 which is connected to magnetic head carrier 3 via link 20.

Figure 2:
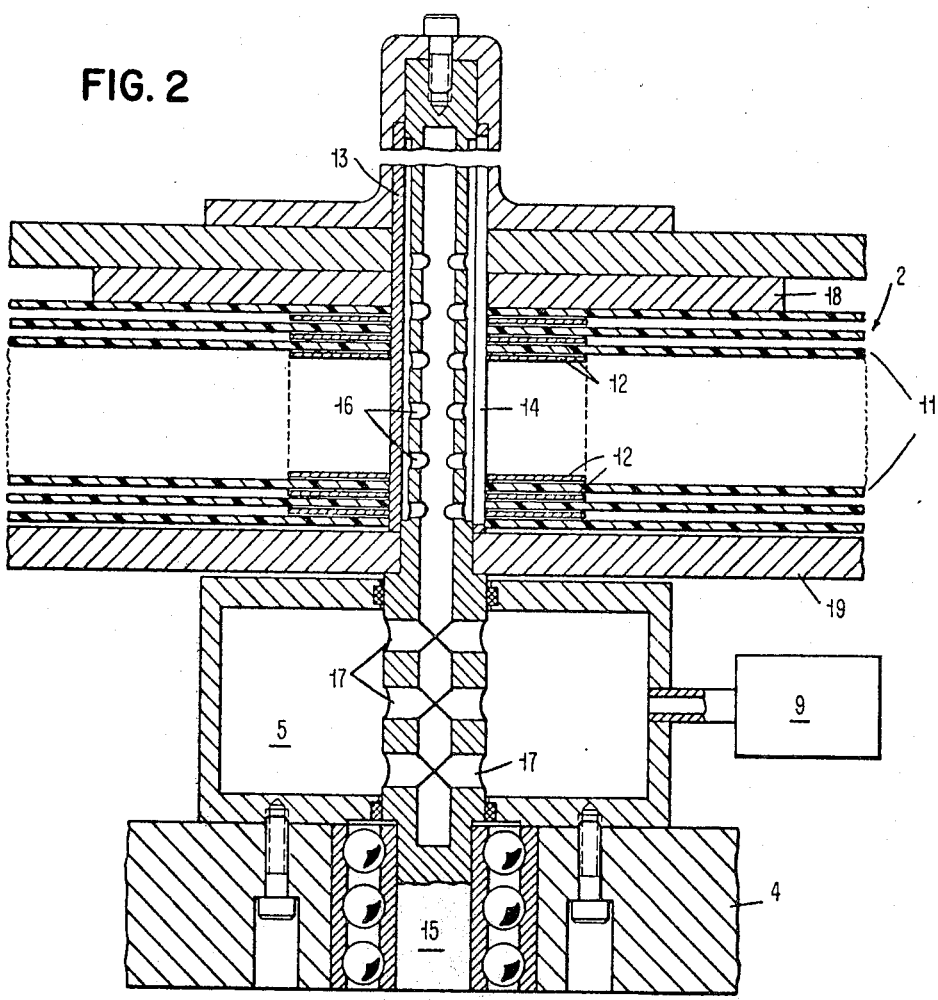
FIG. 2 is a cross-sectional view of the pack of flexible magnetic disks of FIG. 1 and their drive unit taken in the direction of the arrows along line 2—2 of FIG. 1.

Disk pack 2, a cross-sectional view of which along the central axis is shown in FIG. 2, comprises the flexible magnetic disks 11 which by means of stabilizing rigid flanges 18 and 19 are firmly linked to drive shaft 15. The flexible magnetic disks 11 arranged between the two flanges 18 and 19 in the form of a pack with spacers 12 are kept in place between the flanges by bolts (not shown) axially extending through disk pack 2. On the lower part of drive shaft 15, air inlets 17 are provided connecting the interior of drive shaft 15 designed as a hollow shaft via the cylindrical interior of base 5 to pressurized air generator 9. On the upper part of drive shaft 15 alongs its circumference, outlets 16 are arranged ventilating the intersticial spaces of the flexible magnetic disks 11 via axial slots 14. In this manner, the flexible magnetic disks 11 can be prevented from adhering to each other during the rotation of disk pack 2. This adherence is produced by the rotational speed of the magnetic disks which are boundaries to thin air spaces in which the air molecules are expelled radially outwards by the occurrence of high centrifugal forces. In the absence of pressurized air in the hollow shaft, the thus resulting evacuation of the intersticial spaces between the magnetic disks would lead to the flexible magnetic disks 11 being forced against each other at high power, thus impeding the insertion of access arm 3 onto the rotating magnetic disk pack.

Figure 3:
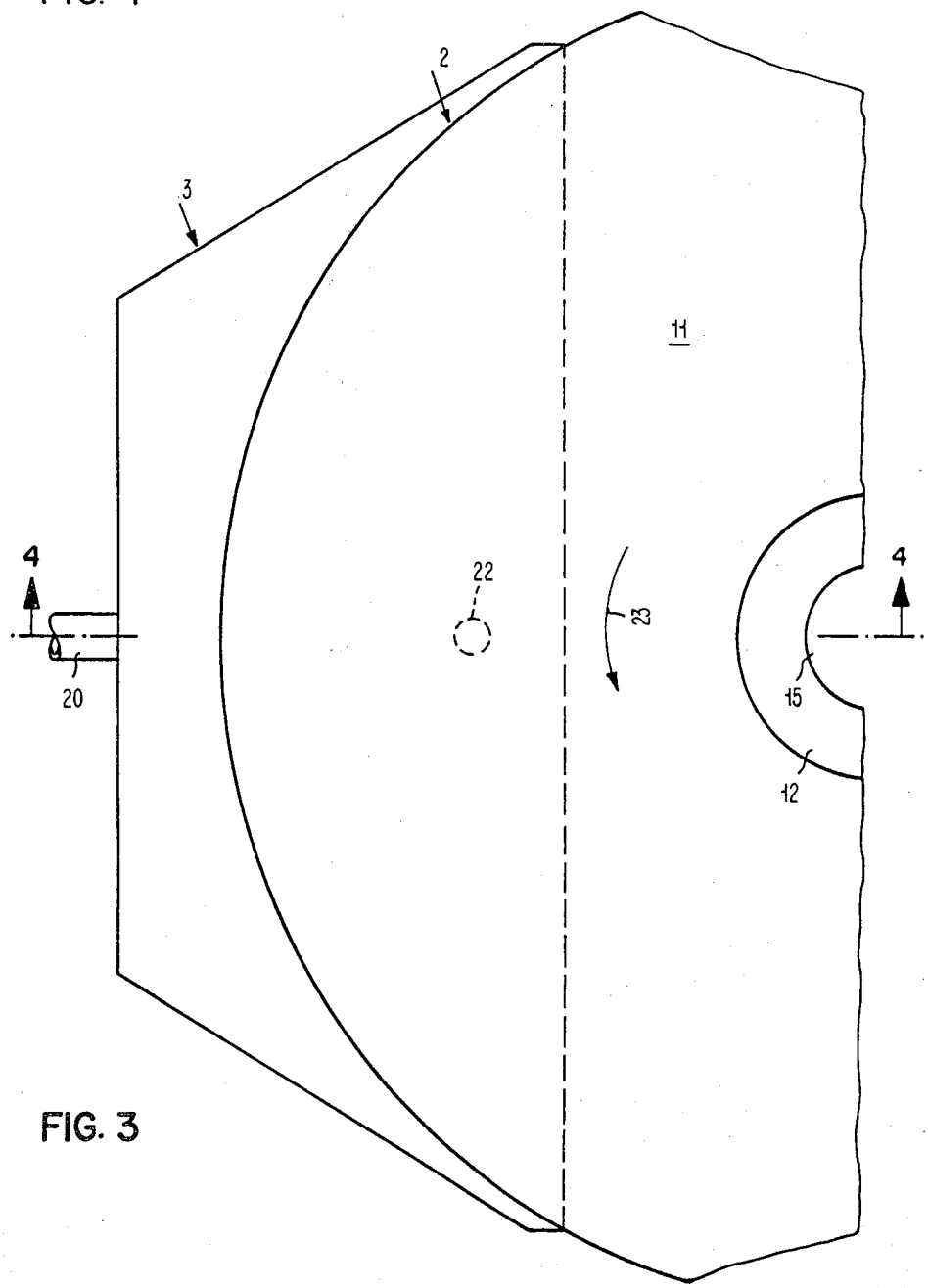
FIG. 3 is a schematic representation of the access arm and the magnetic disk in a disk pack whose surface the access arm with the magnetic head is to transduce.

FIG. 3 shows the position of the magnetic head carrier 3 with the magnetic head 22 as it is being adjusted by link 20 to the surface of a magnetic disk 11 for the purpose of recording/sensing data. During this process, the magnetic disk 11 is rotated by drive shaft 15 at high speed in the direction of arrow 23. As a result of the friction existing between air and disk surface, this leads to the air molecules on the surface of the magnetic disk to be also rotated in the direction of arrow 23. The rotation in its turn produces centrifugal forces moving the air molecules at an additional force component in a radial direction.

Figure 4:
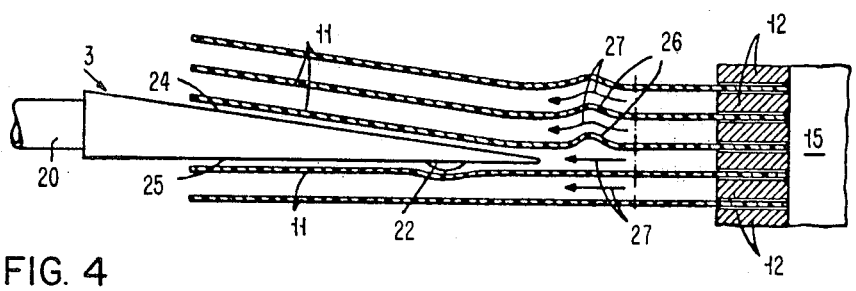
FIG. 4 is a diagrammatic cross-sectional representation of a section of a disk pack onto which the access arm with the magnetic head has been inserted.

The cross-sectional view of a disk pack along a radial line in accordance with FIG. 4 illustrates the effect of the air moving between the flexible magnetic disks 11. When magnetic head carrier 3 with magnetic head 22 is inserted between two magnetic disks 11 at a selected point of the disk pack, the wedge-shaped design of the magnetic head carrier 3 leads to an enlargement of the space of insertion so that the plane surface 25 of the wedge-shaped magnetic head carrier 3 leaves the magnetic disk 11 arranged below in its approximately horizontal position, bending it only slightly, and that the magnetic head carrier surface 24 arranged at a positive angle bends the magnetic disks 11 arranged above angularly upwards. For the accurate transfer of the data signals between the magnetic head 22 and the flexible magnetic disk 11, it is essential that the distance between these two parts is kept constant during operation. Between the magnetic disks 11 held at short distances on drive shaft 13 by spacer disks 12, outwardly spiralling air currents result whose direction is indicated by arrows 27. These air currents lead to a warping 26 of the magnetic disks 11 whose physical position may be changed as a function of the respective forces generated by the air flows. The distance between the magnet head 22 and the magnetic disk 11 arranged below may thus be changed, so that a particular track position of the magnetic head 22 and its spacing from the disk surface is no longer guaranteed.

Figure 5:
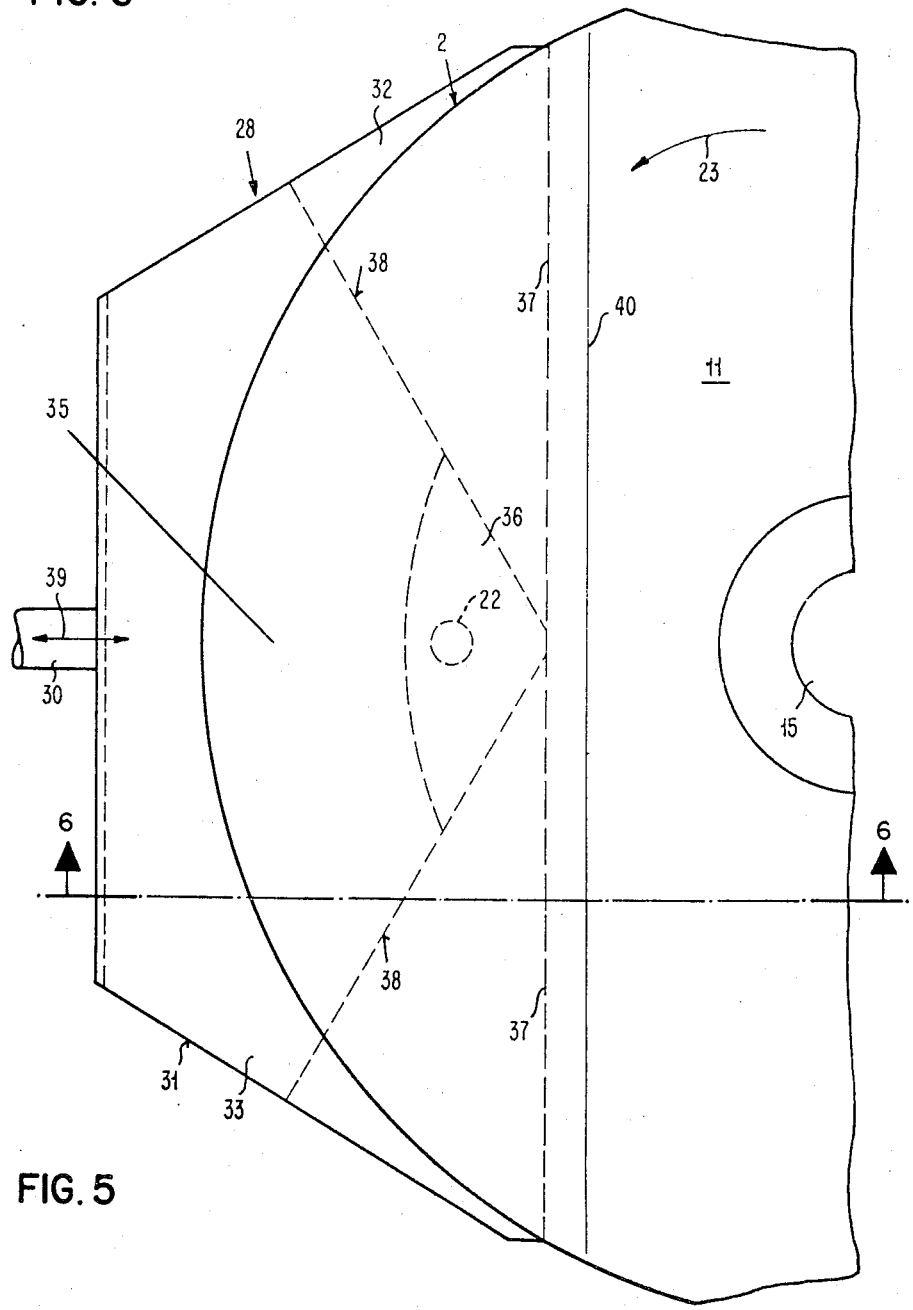
FIG. 5 is a diagrammatic sectional representation of a magnetic disk pack with an inserted access arm made in accordance with the present invention.

In accordance with the invention, the embodiment of an access arm 28 shown in FIG. 5 for the pack 2 of flexible magnetic disks 11 of FIG. 1 renders the position of the magnetic disks passing along the magnetic head carrier 32 more stable when the latter is inserted between two selected magnetic disks during the rotation of disk pack 2.

Access arm 28 comprises the link 30 on whose end the magnetic head carrier 31, which preferably consists of die cast or laminated metal, is arranged. The magnetic head carrier 31 is a hollow body having a triangular cross-section. In the area 36 at the end of the horizontally arranged plane confining surface 33 of the magnetic head carrier 31, the magnetic head 22 is mounted which causes data to be recorded/sensed on selected circular tracks of the magnetic disk 11 arranged horizontally below the magnetic head. The upper confining element 32 of the magnetic head carrier 31 is disposed at an acute angle to the lower confining element 33. Upon being inserted into disk pack 2, this confining element of the access arm causes the magnetic disks 11 above the magnetic head carrier to be angularly bent in the form of a circle sector in relation to the disk plane. This bend occurs along chord 40 in FIG. 5.

Figure 6:
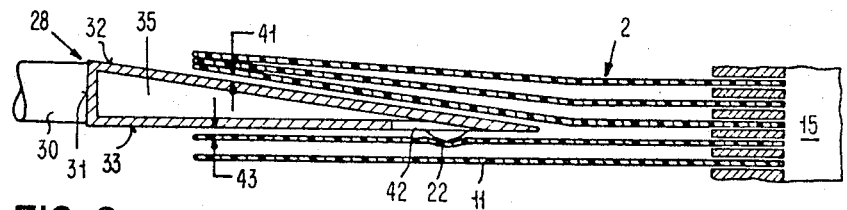
FIG. 6 is a cross-sectional representation along line 6—6 of FIG. 5.

A more illustrative representation of the embodiment of the magnetic head carrier 31 and the parts of the disk pack 2 connected thereto is contained in FIG. 6 showing a cross-section along line 6—6 of FIG. 5. The two confining elements 32 and 33 of the magnetic head carrier 31 which are arranged at an acute angle are the boundaries to a hollow space between lines 37 and 38 forming an outward air-receiving flow channel. This prevents the air molecules in the insertion space of the disk pack from accumulating on the leading side (by back pressure) of the magnetic head carrier 31 with respect to the direction of rotation of the disk pack. Air enters through the inlet 36 of flow channel 35 adjacent arrow 23 and between lines 37 and 38 to be subsequently discharged through its outlet between lines 37′ and 38' on the trailing side of the magnetic head carrier.

The position of the magnetic disks 11 in the insertion accessing space of the disk pack 2 may also be stabilized by air bearing forces of different magnitude being formed on more than two surface areas of the insertion space. This is accomplished by the surface shape of the confining elements 32 and 33 of the magnetic head carrier providing at least three different spacings in relation to the surfaces of the magnetic disks which are boundaries to the insertion space.

The surface shape of the confining elements 32 and 33 of the magnetic head carrier 31 will be explained by means of FIG. 6 which is a cross-sectional view along line 6—6 in FIG. 5. As will be seen from FIGS. 5 and 6, the confining elements 32 and 33 at the radially inward tip of the magnetic head carrier 31 are connected in the area 36 carrying the magnetic head 22. The front edge 37 of the upper confining element 32 is arranged perpendicularly to the radial direction of insertion of arrow 39. The length of this front edge is preferably such that it protrudes on both sides of the circumference of the magnetic disks 11 at the maximum depth of insertion. The positive angle of the confining element 32 causes the magnetic disks above the magnetic head carrier to be raised, so that they are bent along chord 40, passing along the surface of confining element 32 in the form of a circle sector. The front edges 38 of the lower confining element 33, rather than extending perpendicularly to the centerline of access arm 28, are arranged at an angle thereto. Thus, on the lower side of the magnetic head carrier 31 in the sectors of the magnetic disk arranged opposite the spacing areas 42, FIG. 6, marked by a dotted line, are formed in relation to the surface of the magnetic disk. These spacing areas 42 formed between the confining element 33 and the surface of the magnetic disk 11 produce bearing forces on the access arm on both sides of the centerline. These forces are supplemented be bearing forces formed by means of spacing 43 shown in FIG. 6 in the center area of the access arm in a sector of the insertion space. They are also supplemented by the spacing 41 of FIG. 6 which is formed between confining element 32 and magnetic disk 11 in the area of the whole circle segment of the insertion space. The forces of the air bearing produced at several points of the magnetic head carrier within the space of insertion stabilize the position of the magnetic disks 11 passing along both confining surfaces 32 and 33 of the magnetic head carrier 31. In accordance with the representation of FIGS. 5 and 6, this arrangement of the magnetic head carrier ensures that its confining elements within the insertion space are so shaped that unequal forces of the air bearing are generated on four different surface areas of the magnetic head carrier. The magnetic disk 11 passing along the lower confining element 33 of the magnetic head carrier is guided on three of these surface areas, so that three different air bearing components are formed, stabilizing the position of the magnetic disk 11 in the area of the magnetic head 22. Simultaneously, this type of design permits the formation of access arm 31 flow channels 35, through which the air molecules carried along the surfaces of the magnetic disks are discharged.

The ports 37, 38, 37', and 38' of the flow channels 35 formed along the radial inward edge 38 of confining element 33 may be produced by lapping in such a manner that in the areas of the spacing 42 the material of confining element 33 in the regions between front edges 37 and 38 is eliminated. This permits manufacturing the magnetic head carrier assembly 28 true to measure at minimum tolerances.

Figure 7:
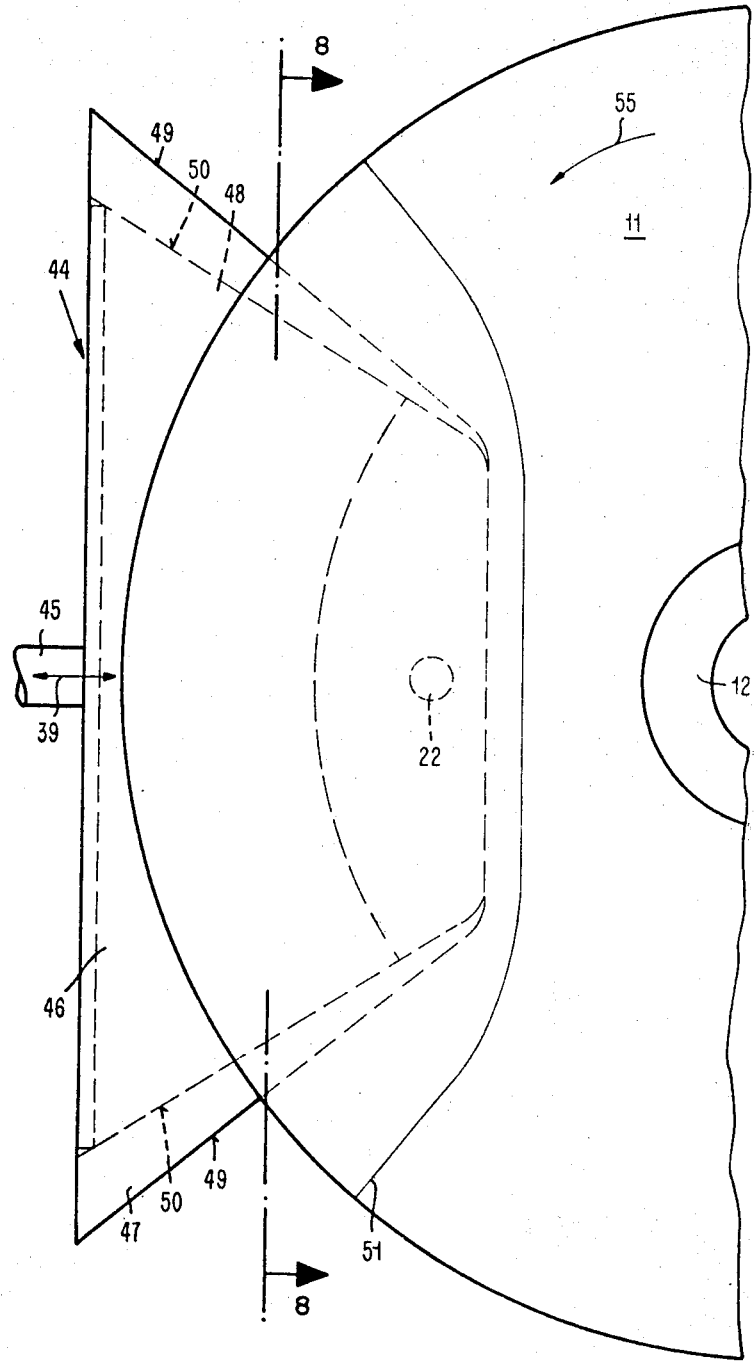
FIG. 7 is a sectional view of a further embodiment of a magnetic disk storage with an access arm in accordance with the present invention.
Figure 8:
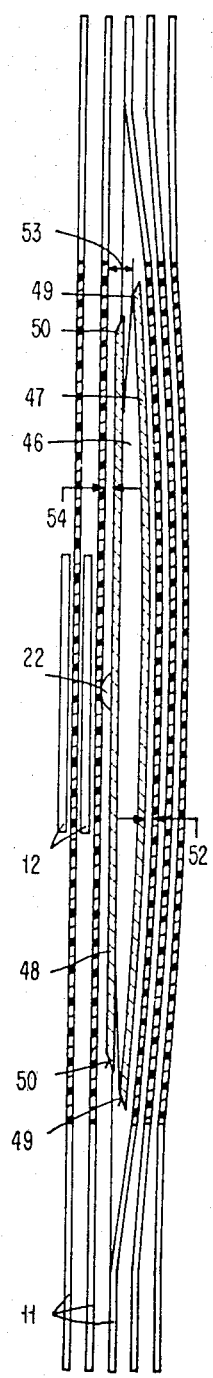
FIG. 8 is a cross-sectional representation along line 8—8 of FIG. 7.

FIGS. 7 and 8 show the embodiment of an access arm 44 with a link 45 and a magnetic head 22 fixed to a magnetic head carrier 46 and which is adjusted in the directions of arrow 39 on disk pack 2 of FIG. 1. With this embodiment of the magnetic head carrier, only the lower confining element 48 carrying the magnetic head 22 is designed as a plane or slightly bent surface. The surface of the upper confining element 47 is bent to such an extent that it tapers off from the connection with link 45 to the tip on which the magnetic head 22 is arranged (see FIG. 8). Also tapered is the upper confining element 47 from the centerline to the lateral edges 49 of the upper confining element 47 so that, as shown in FIG. 8, the cross-sectional shape along line 8—8 of FIG. 7 results. This causes the flexible magnetic disk 11 rotating above the magnetic head carrier 46 to be raised along chord 51 of FIG. 7 and to be guided above the upper confining element 47 from the leading to the trailing side of the magnetic head carrier 46 with respect to the direction of rotation marked by arrow 55.

The upper confining element 47 and the lower confining element 48 of the magnetic head carrier 46 are boundaries to a hollow space. This space serves as a flow channel through which air molecules are discharged from the leading to the trailing side of the magnetic head carrier. This stabilizes the position of the magnetic disk 11 passing along magnetic head 22 in the insertion space. The position of the magnetic disk is also stabilized by the lateral edges 49 of the upper confining element 47 on the leading/trailing side of the magnetic head carrier preceding or following the lateral edges 50 of the lower confining element 48. Thus, at different points of the magnetic head carrier, different spatial areas 52, 53, and 54 are formed in relation to the surface of the flexible magnetic disks 11 confining the space of insertion. These areas lead to different forces supporting the magnetic disks 11 on the access arm. As the spacing between the two confining elements 47 and 48 which forms the hollow space of the magnetic head carrier is very small in the region of the lateral edges 49 and 50, the inlets and outlets on the leading or trailing side of the magnetic head carrier, preferably consisting of die cast or laminated metal, are produced by grinding down the parts of the lower confining element 48 existing between the lateral edges 49 and 50. This permits manufacturing the inlets and outlets of the hollow space true to measure at minimum tolerances.

Irrespective of the physical orientation of apparatus 1, the term "downward" means on the confining element 33 side of access arm 31 and "upward" means on the confining element 32 side of access arm 31.

Accordingly, with a preferred form of the invention, stabilizing air flowing adjacent a disk to be access is partially diverted through the access arm. This diversion causes the adjacent disk being accessed to move axially toward head 22 thereby enhancing head-medium relationships for facilitating more reliable recording while permitting spacings 41 and 43 (FIG. 6) to be achieved. Head 22 is preferably circumferentially aligned with the inlet 37, 38 and outlet 37', 38' of air diverting flow channel 35. The flow channel 35 may be used with access arms of diverse shapes and modes of operation. The diversion also tends to reduce a bow wave 26 of FIG. 4 to a more desirable disk stable state shown in FIG. 6. This reduction is believed caused by less back pressure due to access arm insertion. In a broader aspect of the invention, a bow wave reduction is achieved by an access arm having disk shape effecting means at a leading edge of the access arm, corresponding to inlet 37, 38 (FIG. 5) for flow channel 35. Such flow channel need not be interior to the access arm 28, but may be a recessed channel in confining member 33 extending parallel to leading or front edge 37. This channel diverts some, but not all, air from moving spirally outward along disk 11 to flow parallel to chord 40 such that the disk to be accessed moves closer to head 22 for enhancing head-to-medium spacing. The preferred mode is the interior flow channel 35.

While the invention has been particularly shown and described with reference to a preferred embodiment thereof, it will be understood by those skilled in the art that various changes in form and detail may be made therein without departing from the spirit and scope of the invention.

What is claimed is:

1. An access arm carrying a magnetic transducer for use in a magnetic disk storage apparatus having a coaxial stack of flexible magnetic storage disks, means for selectively inserting said access arm into the stack of disks for accessing a first record surface of a first one of said storage disks, means supplying radially outwardly flowing air to stabilize said disks during rotation;
    the improvement including in combination:
    first and second disk confining elements in said access arm joined at an acute angular apex at a radial inwardmost portion of said access arm to be positioned in said stack of disks, each element having a disk facing surface for confining same to a predetermined position in said stack;
    said transducer extending through a first of said confining elements;
    said first confining element having means for diverting air in a predetermined circumferential position with respect to said magnetic transducer to divert a predetermined portion of air from said magnetic transducer whereby said first record surface is disposed at a first predetermined distance from said transducer; and
    spacing of adjacent ones of said record storage disks from said first and second confining element surfaces remote from said transducer being at a different spacing than said first-mentioned predetermined spacing.

2. The access arm set forth in claim 1 wherein:
    said means for diverting includes said first confining element having a recess extending axially into said access arm for receiving air flowing between adjacent ones of said disks including said first record storage disk; and
    said means for diverting extending circumferentially past said transducer for creating a flow channel for said air which circumvents said transducer.

3. The access arm set forth in claim 2 wherein:
    said first and second confining elements enclose a hollow space;
    said means for diverting of said first confining element comprising an inlet adjacent a leading edge of said access arm for receiving air and an outlet adjacent a trailing edge of said access arm for emitting air; and
    said transducer being disposed circumferentially intermediate said inlet and said outlet.

4. The access arm set forth in claim 3 wherein said inlet and outlet each have triangular shapes and having an apex of a triangle substantially radially aligned with said magnetic transducer and extending radially outward of said transducer to a circumferential line adjacent thereto such that spacing between said first magnetic storage disk and said first confining element increases radially outwardly of said transducer.

5. The access arm set forth in claim 4 wherein said first and second confining elements are joined along an elongated apex line disposed along a chordal line of said storage disks; and
    said confining elements extending radially outwardly of said disks at all points including the ends of said apex line and enclosing said flow channel for said air diversion.

6. The access arm set forth in claim 4 wherein:
    said first and second confining elements each have a trapezoidal shape;
    said outlet and inlet being disposed adjacent the juncture of a trapezoidal angled side and said apex with said apex being shorter of two parallel sides of said trapezoidal shape; and
    said magnetic transducer being disposed closer to said apex than another of said parallel lines of said trapezoid.

7. The access arm set forth in claim 2 wherein:
    said first confining element is disposed along a plane substantially parallel to the plane of the disk before deflection, and
    said second confining element disposed at an acute angle with respect to said plane for deflecting one of said disks.

8. The method of accessing a storage surface of a record storage disk disposed within a corotating stack of flexible record storage disks wherein said rotation is stabilized by radial outward flow of air past said disk, including the following steps in combination:
    deflecting disks facing said record storage surface to be accessed;
    inserting an access arm having a stabilizing member between said record surface to be accessed and first of said deflected record storage disks with a transducer extending from said stabilizing member for being in a transducing relationship to said record storage surface to be accessed; and
    circumferentially diverting a predetermined proportion of air from flowing between a magnetic transducer and said record storage disks whereby the spacing therebetween is enhanced for transducing purposes.

9. The method set forth in claim 8 further including diverting said air through said access arm while maintaining stabilizing forces on said axially separated disks.

* * * * *